(12) United States Patent
Lopez

(10) Patent No.: US 6,221,305 B1
(45) Date of Patent: Apr. 24, 2001

(54) COMPRESSION MOLDED NECK BODY WITH SMOOTH INNER WALL

(75) Inventor: Benjamin Lopez, Lakesidepark, KY (US)

(73) Assignee: Milacron Inc., Cincinnati, OH (US)

( * ) Notice: Subject to any disclaimer, the term of this patent is extended or adjusted under 35 U.S.C. 154(b) by 0 days.

(21) Appl. No.: 09/197,934

(22) Filed: Nov. 23, 1998

(51) Int. Cl.[7] ............... B29C 49/04; B29C 49/60
(52) U.S. Cl. ............ 264/533; 264/540; 264/541; 425/525; 425/526; 425/535
(58) Field of Search ............... 264/541, 528, 264/540, 533; 425/526, 535, 525

(56) References Cited

U.S. PATENT DOCUMENTS

| | | | |
|---|---|---|---|
| 4,116,607 | 9/1978 | LeGrand | 425/525 |
| 4,234,299 | 11/1980 | Kuenzig | 425/292 |
| 4,390,338 | 6/1983 | Bowers et al. | 425/525 |
| 4,753,591 | 6/1988 | Maes et al. | 425/525 |
| 4,954,071 | 9/1990 | Austin | 425/531 |
| 5,449,294 | 9/1995 | Spina | 425/525 |
| 5,749,275 | 5/1998 | Dundas et al. | 83/24 |

Primary Examiner—Jan H. Silbaugh
Assistant Examiner—Suzanne E McDowell
(74) Attorney, Agent, or Firm—Stephen H. Friskney

(57) ABSTRACT

The neck finish for a wide range of plastic water dispenser bottles is formed so that it has a smooth, straight inner diameter and is fully calibrated, not requiring any post trimming. The parison is extruded over a fixed blow pin, which also serves as an inner mandrel. The wall thickness of the parison is controlled to provide the desired amount of material to fill the neck area and compression mold the neck body. When the mold is closed on the parison, the area between the cutting ring and striker plate comes into contact to form a calibrated neck finish. The blow pin tip is completely water cooled to the upper end and includes a specially positioned orifices adjacent the end to distribute the blow air so that it spreads out material, thereby reducing material push out and also cools the lower neck area. The assembly is designed to be very rigid, to assist in part de-molding.

2 Claims, 3 Drawing Sheets

COMPRESSION MOLDED NECK BODY WITH SMOOTH INNER WALL

BACKGROUND OF THE INVENTION

1. Field of the Invention

The present invention relates generally to production of bottles by extrusion blow molding and, more particularly, to a method and apparatus for forming a neck finish in a wide range of plastic water dispenser bottles that has a smooth, straight inner diameter and is fully calibrated, not requiring any post trimming.

2. Description of the Related Art

Containers and other hollow articles are frequently formed by blow molding.

The blow molding process involves providing a tube of heated and softened plastics material (parison) about which a two-piece mold is closed. Air or another gas is introduced under pressure into the parison to expand it against the walls of the mold, forming the desired hollow article. Such blow molding machines can be of various types, the most common of which are extrusion-blow molding machines and injection-blow molding machines.

A requirement for the large bottles produced for the water bottle industry is a design that allows effective cleaning so that the bottles can be refilled and reused in a drinking water dispenser. An important feature with respect to the cleaning is a smooth, straight inner diameter for the neck of the bottle, so that there are no irregular surfaces that could retain bacteria or foreign matter. To ensure the desired surface for the inner diameter of the neck, the preferred method of the prior art has been to injection mold the desired neck geometry into a bottle preform that is subsequently reheated and blown to the final shape; i.e., form the bottles by the injection-blow molding process. While this process is very effective in producing bottles having the desired features, it tends to be relatively expensive due to the additional equipment and time associated with injection molding step.

Since extrusion-blow molding machines generally produce a less expensive container, they have also been used to some extent to form water bottles. However, they have not been well accepted because the inner diameter of the bottle neck lacks the desired smooth, straight geometry due primarily to variations in the geometry of the outer diameter. In extrusion-blow molding machines, plastics material is heated and softened in an extruder and is conveyed into a die head from which a tubular parison is extruded. The parison can either be continuous, whereby a plurality of molds are sequentially enclosed about successive, axially spaced portions of the parison, or individual parisons can be intermittently extruded into the mold area using an accumulator. In either case, the material is then ejected through an annular die to form a parison having the desired length, diameter, and wall thickness distribution.

More specifically, in the extrusion-blow molding process, the mold is closed over the parison pinching off (closing) the ends of the tubular parison. Air or another gas is injected inside the parison through a blow pin, expanding the parison to match the mold cavity. Obviously, the mold in this process controls only the shape of the outer surface of the bottle, including the neck. Since the outer surface of the neck has an irregular contour to facilitate use in dispensers or water coolers, the corresponding inner surface is also irregular since the material forming the inside wall is not constrained, resulting in varying wall thickness that further distorts as the bottle cools to ambient temperature.

SUMMARY OF THE INVENTION

It is an object of the present invention to provide a method and apparatus for forming a water bottle that is economical to produce and will have a neck shape that will facilitate optimal cleaning of the bottle for reuse by the consumer. More particularly, it is an object of the present invention to provide a method and apparatus for forming a neck finish in a wide range of plastic water dispenser bottles that has a smooth, straight inner diameter and is fully calibrated, not requiring any post trimming.

In the preferred embodiment, the present invention accomplishes the stated objectives by a method and apparatus that enable the production of compression molded and finish-calibrated bottle neck from relatively a large range of plastic materials. More specifically, the invention involves the extrusion of a parison over a uniquely designed, fixed blow pin, which also serves as an inner mandrel for the neck. The parison wall thickness is programmed to provide the correct amount of material to fill the neck area and compression mold the neck body. During the clamp/mold closing, the area between the cutting ring and striker plate comes into contact to form a calibrated neck finish. Once the mold is closed the blow air enters the specially designed blow pin tip. The blow air is metered out the sides to help spread out material to reduce material push out and help cool lower neck area for a reduced blow air cycle time and distortion. This is achieved by a controlled orifice at the end of the blow air exit, metering the air through the lower side openings. The blow pin tip is also completely water cooled to the upper end. This gives a controlled shrinkage rate with optimum cooling to help reduce cycle time. The assembly is designed to be very rigid and thereby facilitate part de-molding.

In summary, the method and apparatus defined by the present invention facilitate production of economical, easily cleaned water bottles from a wide range of materials. Advantages to the water bottle industry are the wide range of plastic materials that can be used and the range of neck sizes that can be suitably formed. Another achievement is producing the straight inner diameter of the neck that facilitates total cleaning during bottle recycle. In particular, the invention eliminates inner grooves or voids in the bottle neck that would tend to retain stagnant water. This invention applies to both accumulator and continuous blow molding processes.

DESCRIPTION OF THE PREFERRED EMBODIMENT

The present invention involves method and apparatus associated with extrusion blow molding. In particular, it relates to using certain machine elements in a way that cooperates with the mold to form the neck finish of a bottle. Since the general construction and functioning of extrusion blow molding machines are well known in the art, they will not be described in detail here. Rather, the description will focus on only those elements of the machine related to the invention.

Figure 1:
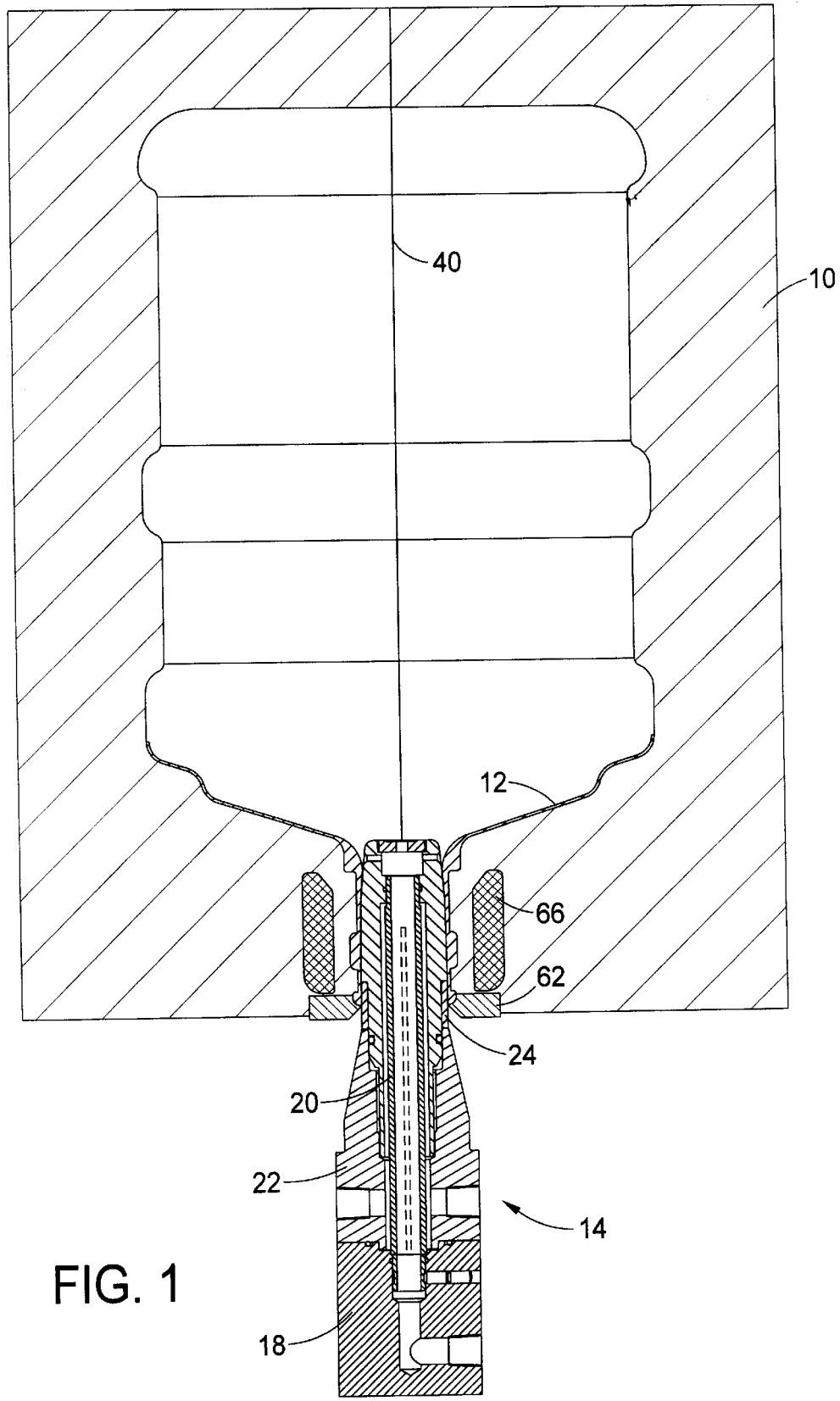
FIG. 1 is a sectional detail view of a typical bottle mold and blow pin assembly used to form a bottle neck finish in accordance with the method and apparatus of the present invention.

Referring now to the drawings, and particularly to FIG. 1, there is shown a section view of a single cavity mold 10 for forming a round, five-gallon polycarbonate water bottles 12. The mold 10 is of typical construction, made of aluminum in two separable segments and equipped with conventional means for cooling. The two segments of mold 10 are mounted in the molding machine so that they close concentric with the extruded parison and a blow pin assembly 14 carried by the machine beneath the mold 10. While the illustrated configuration for the blow pin assembly 14 is consistent with a "bottom-blow" molding machine, the concepts of the invention as described below are also compatible with a "top-blow" machine.

Figure 2:
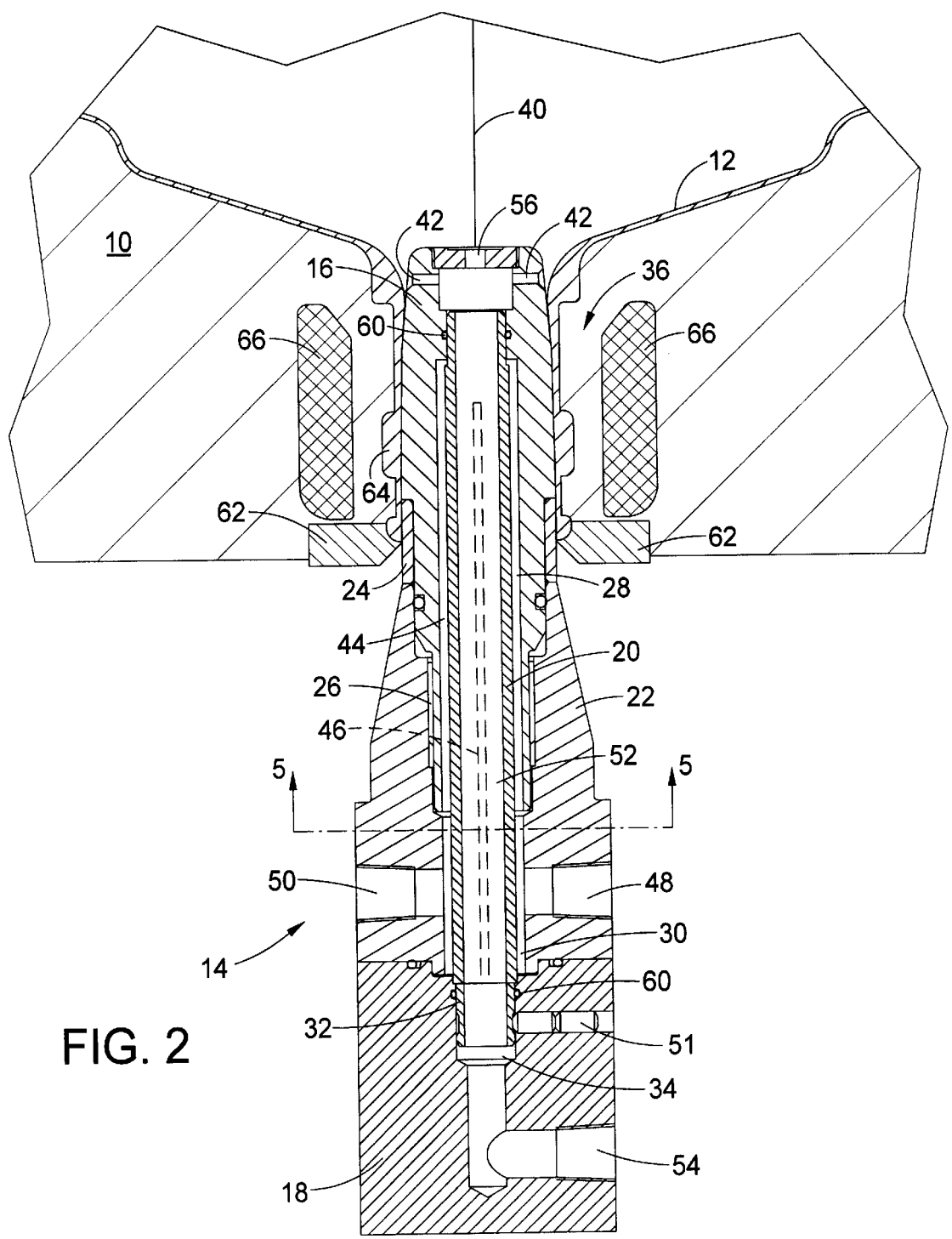
FIG. 2 is an enlarged view of a portion of the drawing shown in FIG. 1.

As best seen in FIG. 2, the blow pin assembly 14 comprises a blow pin tip 16 that connects to a blow pin base 18 through a blow tube 20 and an adapter section 22, constraining a cutting ring 24. More specifically, the blow pin tip 16 has a threaded portion 26 that engages a similarly threaded bore in the adapter section 22. Most of the length of a blow tube 20 is received by concentric bores 28, 30 in the blow pin tip 16 and adapter 22 respectively. The end 32 of blow tube 20 is received by a bore 34 in the base 18. The base 18 is bolted directly to the adapter section 22 so that the blow pin assembly 14 is rigidly held together.

Figure 3:
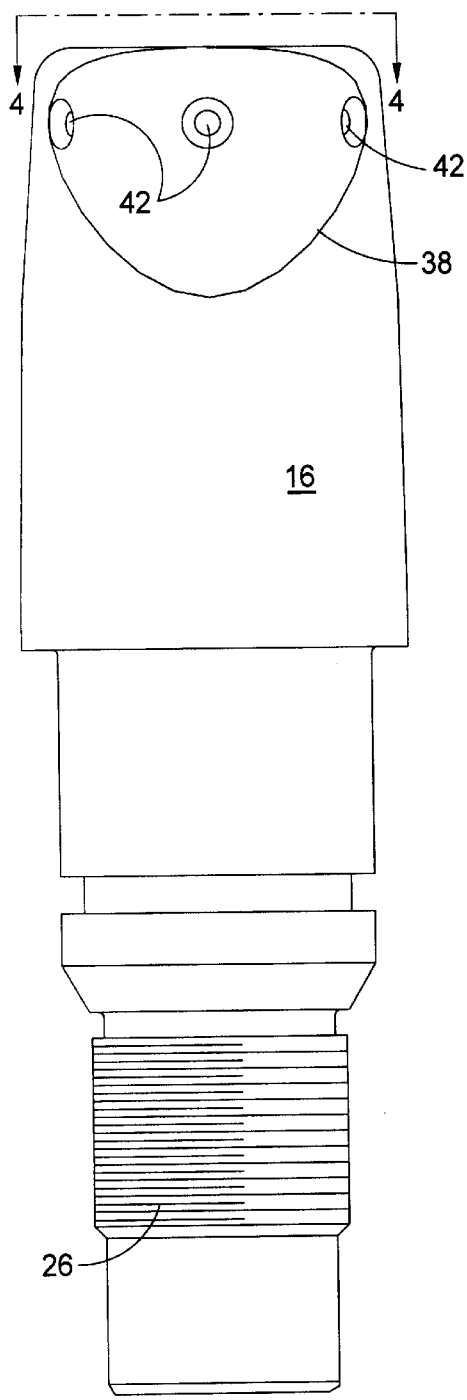
FIG. 3 is a side elevational view of the blow pin tip shown in the blow pin assembly of FIGS. 1 and 2.
Figure 4:
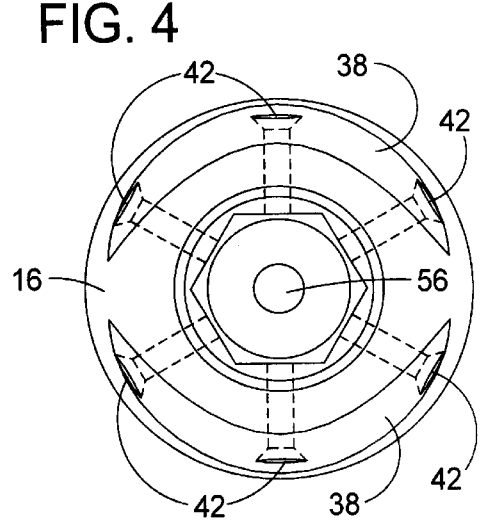
FIG. 4 is an end view of the blow pin tip, taken along the line 4—4 of FIG. 3.

A key element in the proper forming of the neck 36 of the water bottle 12 is the configuration of the blow pin tip 16. Preferably, the tip 16 is highly polished stainless steel, and includes unique oval recesses or cut-outs 38 (see FIG. 3) positioned in line with the parting line 40 of the mold 10. As will be more fully described below, the cut-outs 38 provided recesses to receive excess material during the forming process and thus reduce push-down of excess material at the base area of the neck 36. In addition, the tip 16 includes side blow air orifices 42 used to help spread material around the base of the neck 36 and assist in cooling. Six orifices 42 equally spaced around the circumference of the tip 16 have proven to function well.

Figure 5:
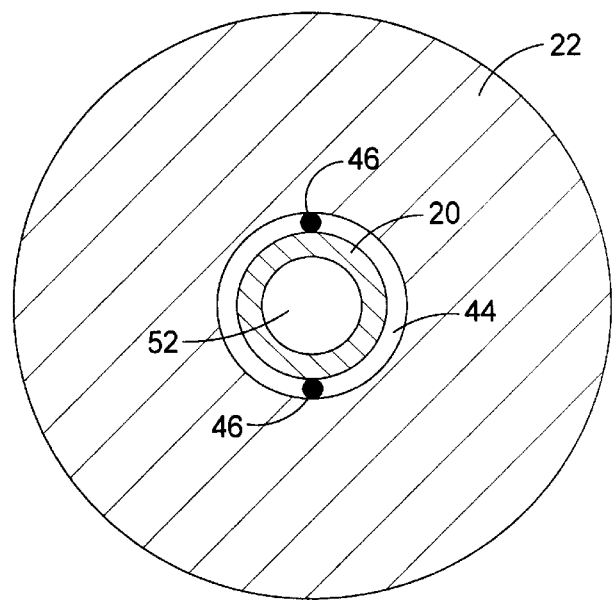
FIG. 5 is a cross-sectional view of the blow pin assembly, taken along the line 5—5 of FIG. 2.

Additional cooling for the blow pin assembly 14 is provided by circulation of water through a defined circuit that goes very near the end of tip 16. In particular, a water flow path 44 is created by the area between in the inner diameters of the bores 28, 30 and the outer diameter of the blow tube 20 water (see FIGS. 2 and 5). In addition, the blow tube 20 is provided with diametrically opposed, longitudinal ribs 46 that serve to divide the flow path 44 into two channels. During operation, the cooling water enters at the inlet port 48 flowing through the flow path 44 up toward the end of blow tip 16, until it passes around the ends of the ribs 46 and returns back down the flow path 44 to exit at the outlet port 50. This configuration enables circulation of water over the length of the blow pin tip 16 for uniform cooling. Preferably, two set screws 51 are provided in base 18 to locate and secure the tube 20 in the proper position relative to the inlet 48 and outlet 50.

It should be noted that while the outer diameter of the blow tube 20 is used for the water circuit, a longitudinal bore 52 in the blow pin 20 provides the primary path for the blow air circuit. More specifically, blow air enters at inlet port 54, passes through the bore 34 in the base 18, on through the bore 52 in the blow tube 20 and exits through the side orifices 42 and an end orifice 56 in the blow pin tip 16. Preferably, O-rings 58,60 are located at positions near the ends of blow tube 20 to separate the water and air circuits. Note also that the size of the end orifice 56 has a direct correlation to the volume of blow air that will exit through the side orifices 42. This allows for variations to optimize the air flow for each application.

The cutting ring 24 works together with striker plates 62 (mounted in the mold 10, see FIG. 2) to perform the side cut calibration on the bottle neck 36. The cutting ring 24 is made from harden material and can be easily replaced along with the striker plates 62 when required to maintain the desired quality of the finish for the neck 36. The cutting ring 24 and striker plates 62 are manufactured to close tolerances to ensure alignment for proper calibration of the neck 36.

When an extrusion blow molding machine having the features of the present invention operates to form water bottles 12, thermoplastic material, polycarbonate, for example, is plasticized in the machine's extruder and fed from the extruder to form a parison. Although this can be done either continuously or by an accumulator, for convenience the present description present how it is accomplished when the extruder output is directed into an accumulator. The plasticized material is retained within an internal chamber of the accumulator until a volume of material sufficient to form the desired bottle is collected. The accumulator ram is then activated to eject the plasticized material from accumulator in the form of a tubular parison. When the parison has been fully ejected, the two segments of the mold 10 close around it, pressing together the ends of the parison. This action forces the material in the area of the neck 36 to conform to the contours in the mold on the outer diameter, and the blow pin tip 16 and cutting ring 24 on the inner diameter. The striker plates 62 come into contact with the cutting ring 24 to trim off excess material and finish form the outlet of the bottle neck 36.

Where the neck 36 of the bottle 12 includes an enlarged area 64, the mold 10 can be provided with raised areas or dams 66 that act to force additional material from the parison into the neck 36 as the mold 10 is closed. About the same time as the mold 10 reaches a closed position, blowing air enters via the inlet 54, passes through the blow tube 20 and exits into the parison via side orifices 42 and end orifice 56. The blowing air expands the parison to fill the mold cavity within the mold 10, while helping to spread material around the base of the neck 36 and assisting in cooling this critical area by exiting through the side orifices 42.

To ensure proper calibration of the neck 36, the mold must remain closed for a period of time, allowing material in the neck 36 to cool sufficiently so that there is minimal dimensional change after the bottle is removed from the mold.

Although a particular embodiment of the present invention has been illustrated and described, it will be apparent to those skilled in the art that various changes and modifications can be made without departing from the concepts of the present invention. For example, the components of the blow pin assembly 14 can be easily altered to produce different neck sizes. In addition, while described and shown with respect to a bottom-blow machine, the concept of neck calibration taught by the invention can be used in other types of blow molding machines, as are generally known in the art. It is, therefore, intended to encompass within the appended claims all such changes and modifications that fall within the scope of the present invention.

What is claimed is:

1. In an extrusion blow molding machine, a method for forming a bottle having a calibrated neck finish comprising the steps of:

(a) extruding a tubular parison over a fixed blow pin, (b) controlling the wall thickness of the parison to provide sufficient material to fill the neck area of the bottle, (c) closing a mold on the parison after it has been received on the blow pin, such that the closing action of the mold segments serves to compress the material of the parison forcing it to conform to the mold on the outer diameter of the neck and around the blow pin for the inner diameter of the neck, and (d) introducing a gas through the blow pin, and distributing the gas through a plurality of orifices around the circumference of the blow pin and near the base of the neck in a manner that tends to spread out material in the neck.

2. The method of claim 1 further comprising the step of:

(e) cooling the blow pin by means of circulation a liquid coolant through a longitudinal flow path within the blow pin.

* * * * *